United States Patent [19]

Hammami

[11] Patent Number: 5,239,321
[45] Date of Patent: Aug. 24, 1993

[54] EYELASH SUPPORTED CORRECTING LENS

[76] Inventor: Hachmi Hammami, 58, rue du Marché Valleyfield Québec, Canada

[21] Appl. No.: 810,860
[22] Filed: Dec. 20, 1991
[51] Int. Cl.$^5$ .................... G02C 7/02; G02C 7/04
[52] U.S. Cl. ........................... 351/159; 351/161
[58] Field of Search ............ 351/159, 160 R, 160 H, 351/161, 162

[56] References Cited

U.S. PATENT DOCUMENTS

| | | | |
|---|---|---|---|
| 3,102,157 | 8/1963 | Gamber | 351/160 R |
| 3,211,810 | 10/1965 | Gamber | 351/160 R X |
| 3,591,264 | 7/1971 | Forrest et al. | 351/160 R X |
| 4,614,413 | 9/1986 | Obssuth | 351/161 |
| 4,850,689 | 7/1989 | Martin et al. | 351/161 |

*Primary Examiner*—Scott J. Sugarman
*Attorney, Agent, or Firm*—Pierre Lespérance; François Martineau

[57] ABSTRACT

An optical lens is mounted to the eyelash of the upper eyelid, hanging thereon in spaced register with the wearer's eyeball cornea. In a first embodiment, the lens is carried by a pair of endwisely hinged peg arms, taking in sandwich the upper eyelid eyelashes so as to be supported by the latter. The lens includes an edgewise flange releasably inserted into a mating cavity made in the underface of the peg lower arm. In a second embodiment, the lens is carried by another pair of integral, inner and outer peg arms, taking in sandwich the two opposite main walls of the upper eyelid and extending downwardly through the upper eyelid eyelashes. The inner peg arm is then surgically implanted subcutaneously to the upper eyelid and fixed by temporary stitches.

16 Claims, 4 Drawing Sheets

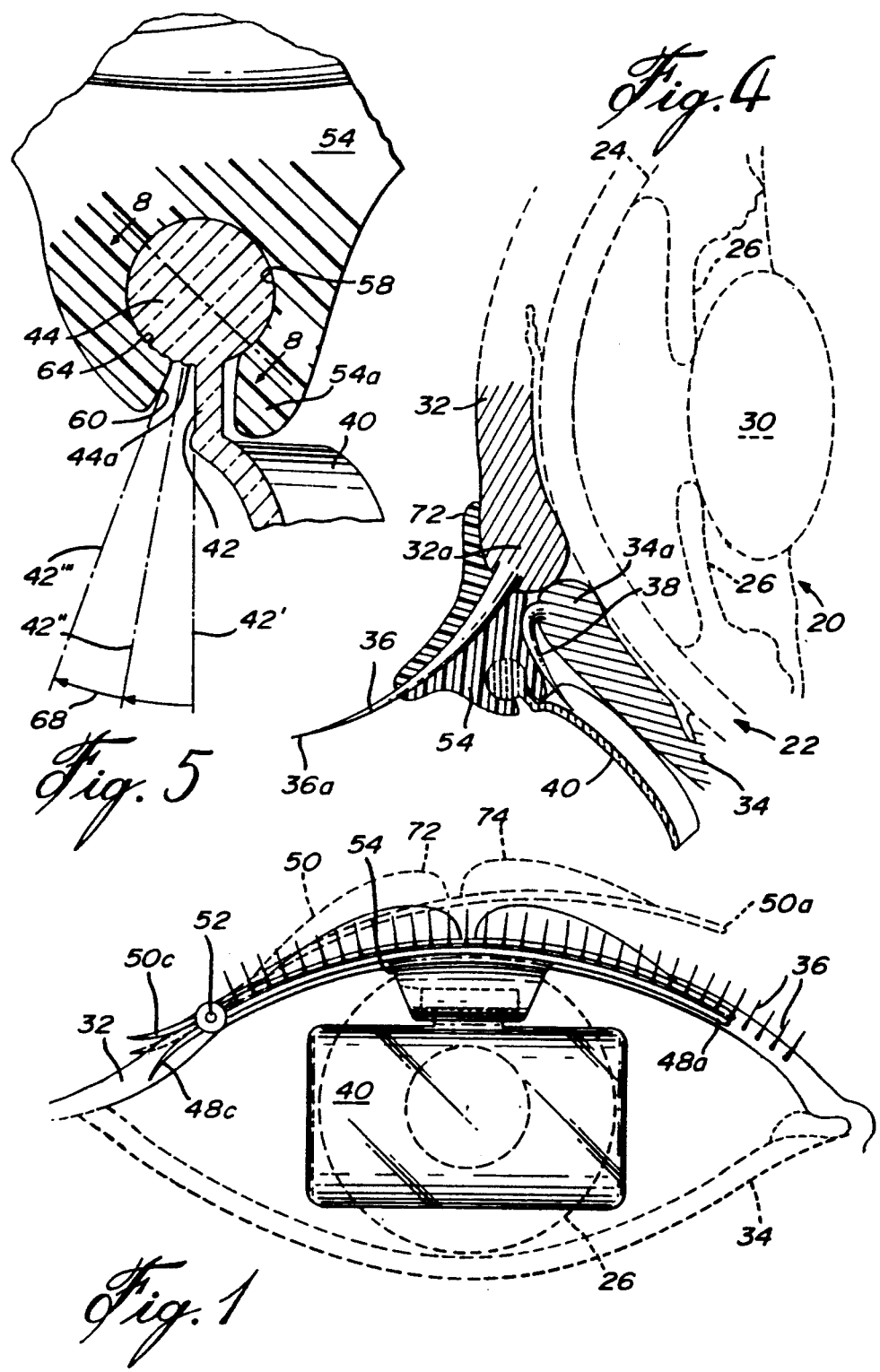

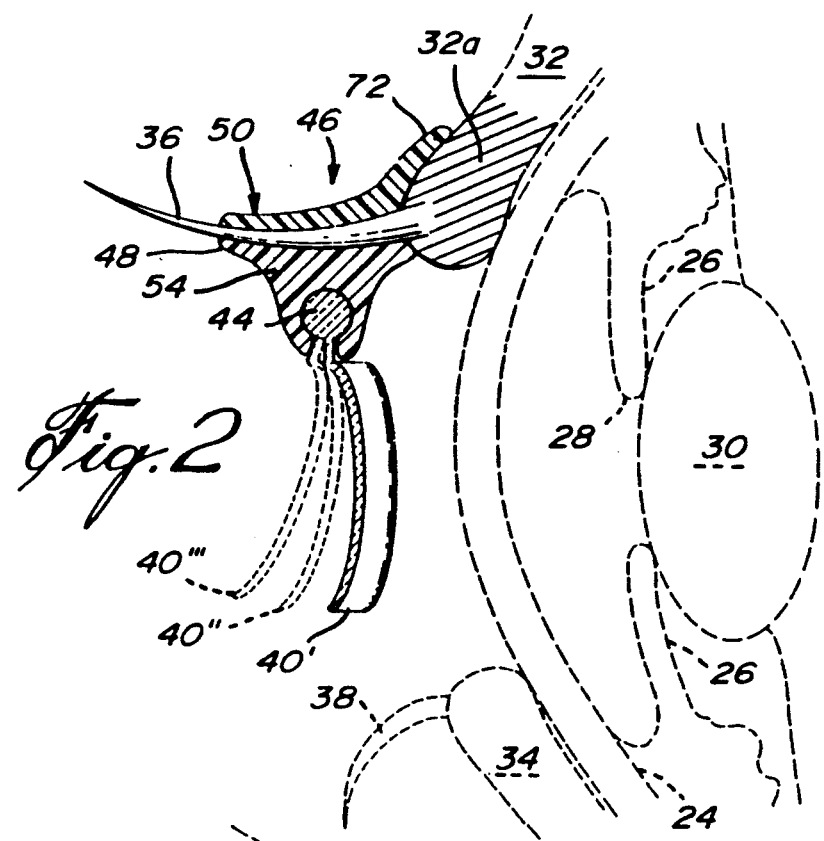
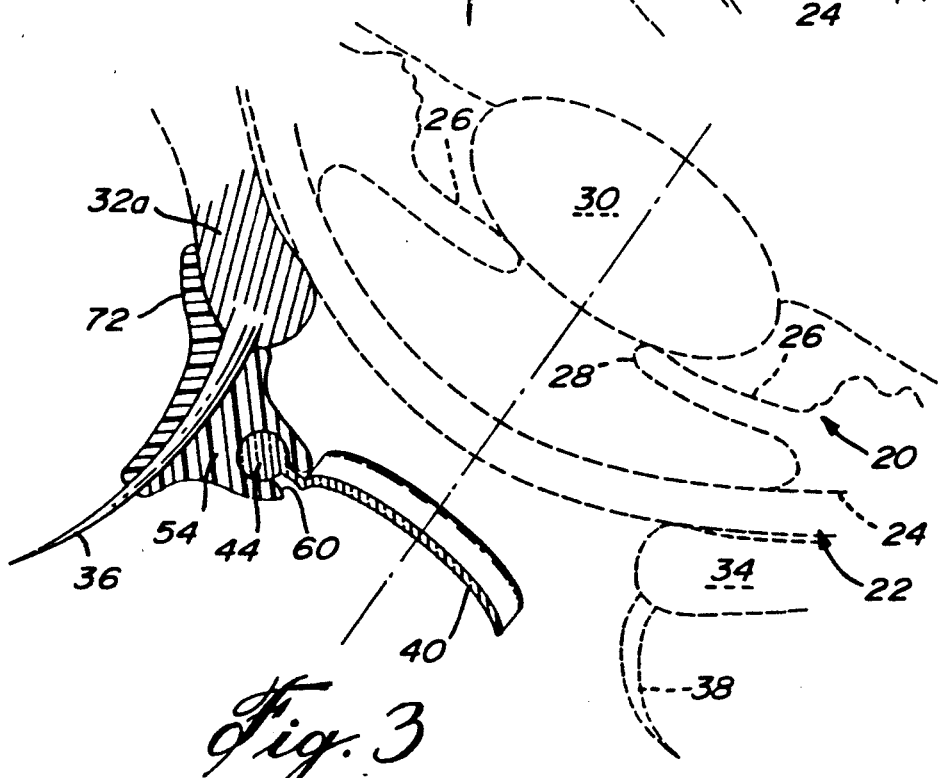

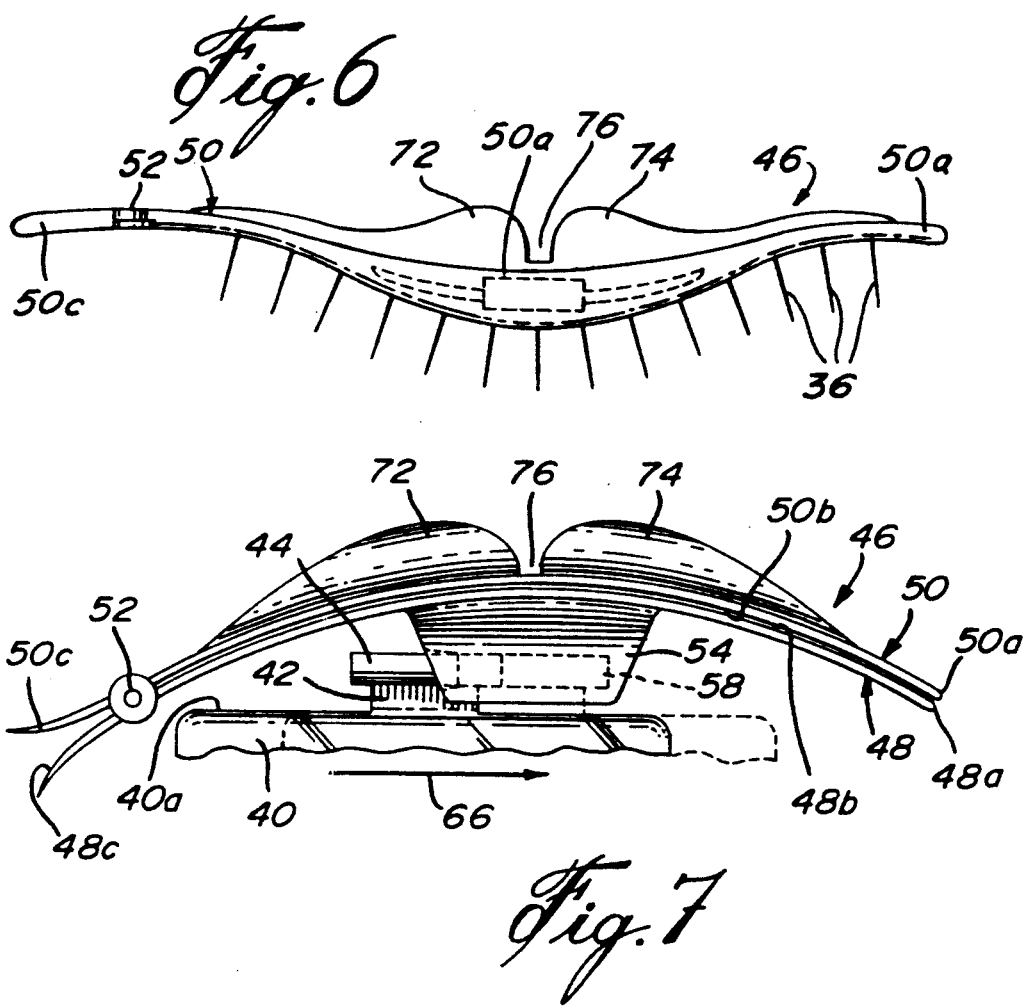
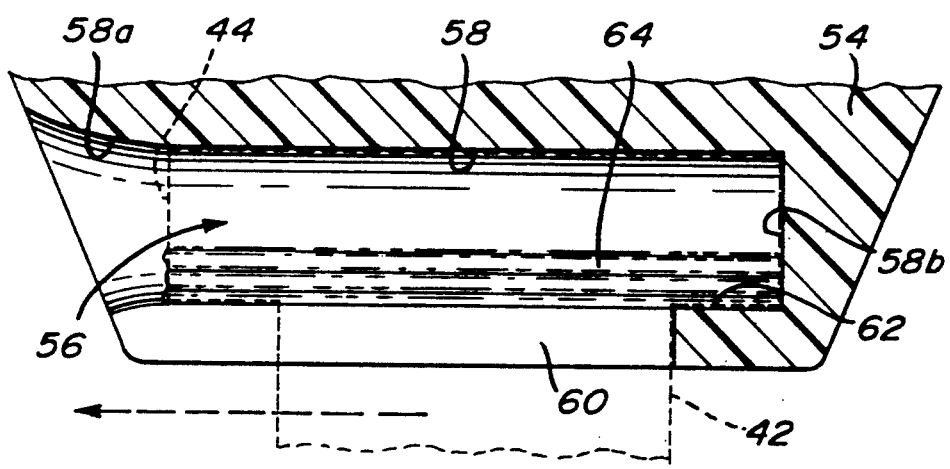

EYELASH SUPPORTED CORRECTING LENS

FIELD OF THE INVENTION

This invention relates to an assembly for supporting a small optical correcting lens onto the upper eyelashes and located ahead of the eyeball cornea spacedly therefrom.

BACKGROUND OF THE INVENTION

In human, the eyes, which are almost perfect spheres, are contained by the bony orbits of the skull and project outwardly therefrom and are made rotatable therewithin through actuation of any one or more of the three pairs of agonist and antagonist oculomotor eye muscles: the four recti muscles and the two oblique muscles. Each eye has a pair of upper and lower lids to close it off from the environment. The process of closing the lids is mediated by a relaxation of the levator palpebrae muscle, coupled with a contraction of the obricularis oculi muscle, which occur during e.g. spontaneous blinking. A blink is bilateral, lasts about a quarter of a second and takes place throughout waking life once every few seconds. On the margins of the eyelid, there are eyelashes, or cilia. Totalling about two hundred in each eye, they have an average life of a few months.

The discoid glassy front of the eyeball, the cornea, is the principal image-forming surface thereof. In normal eyes, because of the large difference between the cornea refractive index and that of air, the cornea has an optical power of forty diopters (the number of diopters is given by 100/f, where f is the focal length in centimeters).

Sadly, defects of sight are common. The commonest problem is out-of-focusness or ametropia, which includes: hypermetropia, or long-sightedness; myopia, or short-sightedness; and presbyopia. The first defect can be corrected by increasing the dioptric power of the eye with convexo-convex lenses. The second defect, usually caused by an elongation of the eyeball, can be corrected by reduction of the dioptric power of the eye by means of a concavo-concave lens. Presbyopia affects virtually everyone starting from about forty years of age.

The prior art reveals that four methods have been developed to correct these conditions.

The first and most common sight correction method has been to provide spectacles consisting of a frame carrying a pair of optical lenses spacedly in front of the eyeballs. The spectacle frame rests on the wearer's nose and ears. Such spectacles are often the most comfortable and safest healthwise. However, because of the relatively large distance between each spectacle lens and the eyeball cornea, optical aberrations are introduced and there is a limitation on the overall visual field —the projection of the outside world onto the retina—. Also, because they are automatically noticed by nearby persons looking at the spectacled wearer, they tend to be a concern to aesthetically conscious spectacles wearing persons; moreover, athletes playing relatively rough sports such as soccer or basketball may find it difficult to keep their spectacles on their nose because of blows sustained from time to time during play.

An alternate embodiment of the first method of sight correction with spectacles, includes hydraulic lenses, wherein different amounts of fluid are forced between thin flexible glass plates. The fluid having a different refractive index than air, the dioptric power of the lens can be varied and adjusted by the wearer accordingly. Of course, such a spectacle assembly is quite complex and has not met wide approval among the general public.

The second method of sight correction consists in providing a smaller concave lens to fit flatly and directly against the (convex) cornea of each eyeball. These are called "contact lenses", because they engage physically with the eyeball flatly thereagainst. See for instance U.S. Pat. No. 4,850,689 issued 25 July 1989 to Martin. Optical Aberrations are therefore practically eliminated, and the lenses are concealed. Also, contact lenses can correct the irregular shape of the cornea in conditions of keratoconus, scarred cornea or other related conditions or irregular astigmatism. On the other hand, a myriad of complications are associated with contact lenses: periodic upkeeping, foreign body irritation, allergy reaction and particularly bacterial infections which could compromise the long term health condition of the eyeball.

A third method of sight correction, disclosed in U.S. Pat. No. 3,591,264 issued in 1971 to Forrest, tries to combine the advantages of the first and second above-noted methods while avoiding their drawbacks. In this patent, a small lens is edgewisely mounted to each lower eyelid, to project upwardly therefrom to come in register with the eyeball line of sight. This small lens is anchored to the lower eyelid by a pressure sensitive adhesive strip, so that it never engages the eyeball cornea although it is positioned very close thereto. The lens does not interfere with closing of the eyelids, and is concealed to all but those that take a close look at the eyes of the wearer. The field of view is very wide, almost as wide as for contact lenses.

The major weakness of the Forrest patent is its anchoring means to the eyelid, and more to the point, its outwardly upwardly inclined orientation. Indeed, use of such a lower eyelid dependent optical lens is quite limited in that it cannot be used for straight ahead vision of distant objects, since its general plane lies at an angle relative to the line of sight distant vision axis of the eye. Moreover, this lens could not be mounted to the upper eyelid, due to the particular type of anchoring means envisioned (the pressure sensitive adhesive strip), since it would eventually fall off from the upper eyelid by its own weight. Its general orientation—diverging upwardly and outwardly from the eyeball—further means that, due to its inherent weight, the lens will tend with time to pivot away from the eyeball. This downward pivot motion of the lens will obviously decrease in a progressive fashion the relative acute angle made between the plane of the lens and the near-sight vision line of sight of the eye, thus in effect changing the dioptric power of the lens and consequently, blurring the vision of the wearer with time. Moreover, this progressive downward motion of the lens will bias the latter to eventually fall off from the lower eyelid, or at least will induce load-bearing forces about the lower eyelid free edge, which will shear the lower eyelid anchoring tissues and eventually damage same.

The last method of sight correction consists in invasive surgery of the eyeball itself, either by incision of the cornea with knives or by photo-refractive keratectomy with the lasers (Excimer Laser, Picosecond Nd: YAG-Laser, etc.), to permanently correct the visual impairment. The incisional method has been pioneered by a Soviet physician, Konstantin Feodorov, in the case of myopia, through a technique known as radial keratotomy. Radial keratotomy requires deep incisions of the cornea. However, some opthalmologists have expressed concerns about such an operation, because of the non-negligeable risks of harming the eyeball, for example inducing perforation and infection thereof. There is a potential risk of inducing total blindness. As to the photo-refractive method with the lasers is still under investigation: It entails also some risks in addition to the fact that it too much expensive.

Materials that may be used for some of these correcting lens include: polymethyl-methacrylate, polypropylene, or polyethylene-terephthalate (known under the registered trademark DACRON).

OBJECTS OF THE INVENTION

The gist of the invention is therefore to substantially improve upon the general principle outlined in U.S. Pat. No. 3,591,264.

More specifically, an important object of the invention is to address the needs of visually impaired persons in providing an optical correcting lens, which will fit onto and be supported by the eyelashes of the upper eyelid, in a way generally similar to that of conventional false eyelashes.

A general object of the invention is to more thoroughly address all of the cosmetic, optical, financial, ease of use, and weight load considerations of aesthetically sensitive visually impaired persons.

An object of the invention is to provide such an eyelash supported optical lens as above-mentioned, which will include simple means for enabling the wearer himself to variably adjust the spacing gap relative to the cornea for the set position of the optical lens.

SUMMARY OF THE INVENTION

Accordingly with the objects of the invention, there is disclosed an optical correcting lens assembly for use by a visually impaired person, comprising: (a) lens means, for use spacely ahead of the eyeball of said person; (b) anchor means, for releasably engaging the eyelashes of said person's upper eyelid; (c) connecting means, for releasably interconnecting said lens means and anchor means; wherein after each eyelid blinking, said lens means returns to an operative position, suspended to said upper eyelid eyelashes, at a substantially constant, closely spaced distance from the cornea of said person's eyeball.

BRIEF DESCRIPTION OF THE DRAWINGS

FIG. 1 is a front elevation view of an eye shown in phantom lines and with its lids open for far-sight vision, the upper lid supporting a synthetic lens (in full lines) in front of the cornea through a first embodiment of mounting means, the lens support member shown in full lines in closed position and in dotted lines in partly open position;

FIG. 2 is a cross-sectional view of the lens and lens support member from FIG. 1, clearly showing the adjustable spacing gap between the synthetic lens and cornea;

FIG. 3 is a view similar to FIG. 2, but with the eye positioned for near-sight vision;

FIG. 4 on the first sheet of drawings, is a view similar to FIGS. 2-3, but with the lids in closed position, and clearly showing how the lens is nested against the outer wall of the lower lid, in the lens inoperative position;

FIG. 5 is an enlarged view of the synthetic lens mount on the lens support member of FIG. 2, suggesting how angularly intermediate lens positions can be adjustably set relative to the cornea;

FIG. 6, on the third sheet of drawings, is a plan view of the first embodiment of lens support member, shown operatively seating on the upper lid eyelashes;

FIG. 7 is an edge view of the first embodiment of lens support member, suggesting how the optical lens can be released therefrom;

FIG. 8 is a sectional view along line 8—8 of FIG. 5;

DETAILED DESCRIPTION OF THE INVENTION

Figure 9:
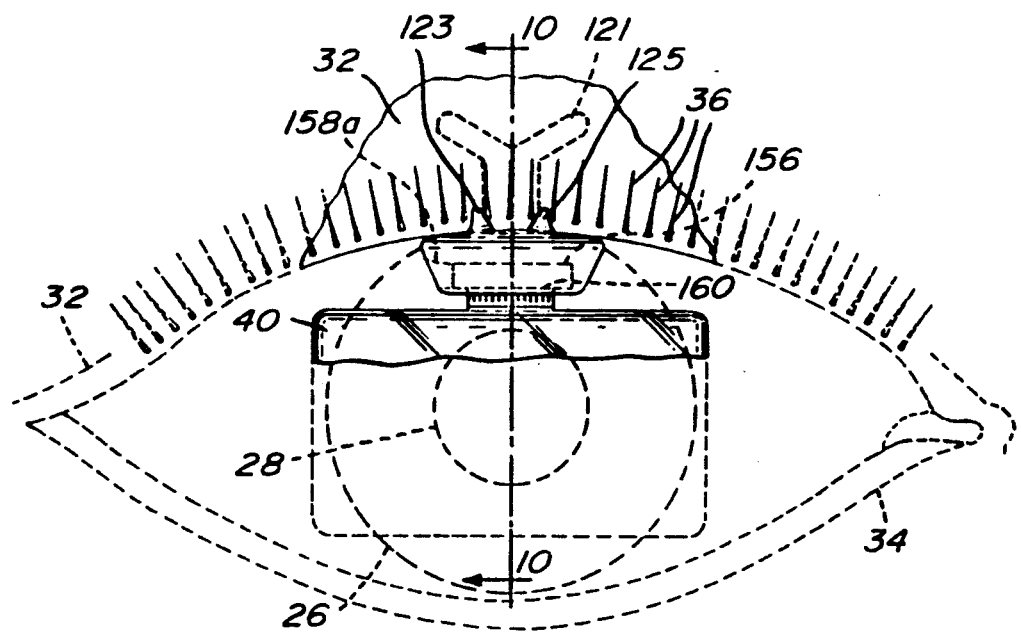
FIG. 9 is a view similar to FIG. 1, but with the synthetic lens partly cut away for clarity of the view, and further showing the second embodiment of lens support member.

Eye 20 consists of an eyeball 22 having a convex glassy front, the cornea 24, an annular iris 26 behind the cornea, a variable diameter aperture or pupil 28 centrally of iris 26, and a biological lens 30 behind the iris for focusing images on the retina (not shown). Upper and lower lids 32, 34 are located in front of the cornea 24, being movable between an open position—FIGS. 1-13—clearing iris 26, and a closed position—FIG. 4 —concealing iris 26. Each lid 32, 34 carries a plurality of eyelashes 36, 38, respectively along its marginal outer portion 32a, 34a extending in a radially outward direction relative to the cornea 24 (i.e. generally opposite cornea 24). As best shown in FIG. 4, when lids 32, 34 are closed, their marginal portions 32a, 34a edgewisely abut against each other; eyelashes 36 extend transversely from lid portion 32a radially outwardly of cornea 22, and similarly eyelashes 38 extend transversely from lid portion 34a, radially outwardly of cornea 22.

The present invention includes a synthetic, optical correcting lens 40, to be mounted to upper lid 32 in spaced register with cornea 24. Lens 40 is shown as rectangular in the drawings, but could have a variety of shapes, provided its area can cover at least the pupil, and preferably a substantial portion of the iris of the eyeball, as shown, in view of providing the widest field of view. For example, lens 40 may be a rectangle of 7 mm × 10 mm. Lens 40 may be biconvex, biconcave, of multifocal type, or of other type, that for example can harbour prisms. Lens 40 should be made from a very light, rigid, transparent material, such as polymethyl-methacrylate, polypropylene and polyethylene terephthalate.

Lens 40 has a straight edge 40a from which transversely projects a finger 42. As best seen in FIGS. 5 and 7, finger 42 is relatively thin, and includes an enlarged, generally cylindrical extension 44, at its free edge opposite edge 40a, Cylindrical flange 44 defines a portion 44a of its arcuate surface adjacent finger 42, which is knurled, for a purpose later set forth.

Accordingly with a first embodiment of the invention, mounting means 46 are provided to secure lens 40 to lid 32. Mount means 46 are best illustrated in FIGS. 6 and 7 and define a pair of elongated arms 48, 50, hinged to one another by a hinge member 52 at one end thereof for relative motion of said arms 48, 50 between a closed position, illustrated in full lines in FIGS. 1 and 7, in which they edgewisely abut against each other, and an open position, illustrated in dotted lines in FIGS. 1, in which their free end tips 48a, 50a opposite hinge 52 are spaced apart from one another. Each arm 48, 50 has an arcuate shape and defines an inner edge 48b, 50b respectively adapted to engage the inner edge of the other arm 50, 48 in the closed position thereof.

Lower arm 48 defines an integral transversely projecting outer flange 54 at an intermediate section thereof, on the side opposite inner edge 48b. Flange 54 is generally quadrangular, slightly narrowing towards its outer free edge. Flange 54 includes a lengthwise cavity 56 at its free edge 54a, opposite lower arm proper 48. As best seen in FIGS. 2–3 and particularly in FIG. 8, cavity 56 defines a generally cylindrical inner channel 58, and a lengthwise mouth 60—preferably funnel shape as shown—of a width substantially smaller than the diameter of cylindrical channel 58, e.g., equal to the radius of channel 58. Channel 58 further defines an endwise mouth 58a—preferably funnel shape as shown—at one end thereof, but is closed at its opposite end 58b i.e. does not axially open outwardly of the body of flange 54 at its end 58b.

Mouth 60 projects from channel 58 generally orthogonally to the lengthwise axis of arm 48, in a direction opposite inner edge 48b. Mouth 60 merges with mouth 58a, at one end, but extends short of channel end 58b at its opposite end, wherein an annular seat 62 is defined about channel end 58b. An arcuate portion of the surface of cylindrical channel 58 adjacent mouth 60, is knurled at 64 all along its length.

The inner diameter of cylindrical channel 58 is approximately the same as the outer diameter of cylindrical stud 44 of lens 40. The thickness of the lens finger 42 must be substantially smaller than the width of mouth 60, e.g. from two to three times smaller relative thereto; while the length of finger 42 must be at least slightly greater than the depth of mouth 60.

It can now be understood how synthetic lens 40 can befit mount means 46. As suggested in FIG. 7, lens stud 44 is endwisely engaged through funnel mouth 58a of flange 54, into channel 58—see arrow 66—. Lens finger 42 slides accordingly through the guiding rail formed by mouth 60, until the stud 44 comes to endwisely abut against the channel end wall 58b, and to be supported in position within channel 58 by annular seat 62. During this sliding motion of shaft 44 through channel 58, flange 54 must necessarily clear at all times the proximate edge 40a of lens 40; this edge 40a need not necessarily be straight—it could be e.g. convex—provided it does not come in the path of travel of flange 54 when shaft 44 slides through channel 58.

As suggested in FIG. 5, lens 40 is pivotable axially about edgewise shaft 44—see arrow 68—since mouth 60 is much wider than the thickness of finger 42. Cylindrical stud 44 is in friction fit engagement within cylindrical channel 58, and shaft knurlings 44a engage channel knurlings 64. Thus, as lens finger 42 is pivoted through the width of flange mouth 60, lens 40 will move in discrete fashion between a number of intermediate "set" positions, e.g. three set positions, as indicated by the intermediate lens finger axes 42', 42", 42"' in FIG. 5, because of the interlocking engagement of knurled surfaces 44a, 64. At each of its intermediate set position 40', 40", ... the lens 40 is frictionally locked against further pivotal motion by the surface interlocking of shaft 44 and channel 58. The frictional locking bias applied by interlocking means 44a, 64 should be greater than the gravitational force applied by lens 40 in any relative position, yet should be smaller than the force required to manually pivot the lens by the lens wearer.

Hence, the wearer himself (or another person) can manually pivot synthetic lens 50 around pivot axis 44—see also FIG. 2—thus enabling real time adjustment of not only the radial distance between lens 40 and cornea 24, but also angular adjustment of the pane of lens 40 relative to the registering tangential plane of the cornea 24. This is particularly advantageous when the wearer is afflicted with the conditions of anisometropia and aniseikonia.

With the arm 48 fitted with shaft 44 of lens 40, arcuate arms 48, 50 are engaged in open position about the arcuately disposed eyelashes 36 of the upper lids 32, i.e. with upper arm 50 extending above lashes 36 and with lower arm 48 extending beneath lashes 36. By pivoting arms 48, 50 one toward the other about pivot axle 52, lashes 36 are thereby taken in sandwich between the facing inner edges 48b, 50b of arms 48, 50. Thus, lens 40 is anchored to lid 32, since lens shaft 44 is suspended to the lashes 36 by arms 48, 50.

Hinge 52 should be of the friction fit type, i.e. that relative movement of arms 48, 50 in their closed position will be possible only through forcible manual bias—arms 48, 50 should not be able to freely open once closed against lashes 36, since otherwise, arms 48 and 50 including lens 40 could accidentally release the lashes 36 when the wearer includes his head on the side of hinge 52. Alternately, hinge 52 could include small spring means, to gently bias the two jaws 48, 50 toward one another.

Preferably, means are provided to facilitate manual handling of pivot arms 48, 50 particularly during relative pivotal motion thereof. Such manual handling means, best shown in FIG. 1, consist in arcuately diverging, short arm extension 48c, 50c, of arms 48, 50 projecting away from hinge 52 in a direction opposite tips 48a, 50a. Manually drawing arm legs 48c, 50c of closed arms 48, 50 toward one another will bias opposite arm tips 48a, 50a away from one another.

Preferably, and as clearly shown in FIGS. 6–7 of the drawings, upper arm 50 forms a wide arcuate flap member 50a, supporting along a major portion of its outer edge a pair of integral, wing-like transverse flanges 72, 74. Flanges 72, 74 are spaced from one another by an intermediate gap or notch 76, and have a shape generally to conform to the marginal portion 32a of upper lid 32. Large arcuate flap 50a—FIG. 6—is to abut flatly against the top surface of lashes 36, while flanges 72, 74 —transversely extending from the inner edge of flap 50—will abut flatly against lid 32a. The purpose of notch 76 is to facilitate the centering of the optical system relative to the eyeball.

As suggested in FIGS. 2–4, when arms 48, 50 are closed onto lashes 36, flanges 72, 74 are to be applied nestingly against the upper lid marginal portion 32a, above lashes 36, while the lower arm 48 edgewisely abuts against lid 32a beneath the root of lash 36. Accordingly, arms 48, 50 and depending lens 40 are prevented from sliding lengthwisely of the lashes 36 and thus from releasing the latter at their free end tips 36a, particularly in near-sight vision position of the wearer.

Referring now more particularly to FIGS. 2–3, it is understood that, when arms 48, 50 are closed against lashes 36 and nested against the lid marginal portion 32a, lens 40 must remain constantly spaced radially from cornea 24, at all of tis intermediate positions 40', 40", 40"', and indeed in all possible positions thereof. Accordingly, the relative width and orientation of the lower arm mouth 60, and the relative spatial location of cavity 56 in the hereinabove noted operative, nested position of arm 48, 50, must be factory adjusted to positively prevent contact of synthetic lens 40 with cornea 24.

It is noted that the inherent resiliency of upper lashes 36 would normally allow them to yield to a forcible downward bias from their usual radially outwardly extending orientation relative to cornea 24. However, due to the lid conforming flanges of anchoring arms 48, 50, the lashes 36 will not yield to such biases except for those of excessive force (with tissular damage). Moreover, when the lids 32, 32 are closed—FIG. 4—, lens 40 is brought to slide over lower lashes 38 and therebeyond, to abut flatly against the lower lid 34 in an unobtrusive fashion, again positively clearing the cornea.

Figure 10:
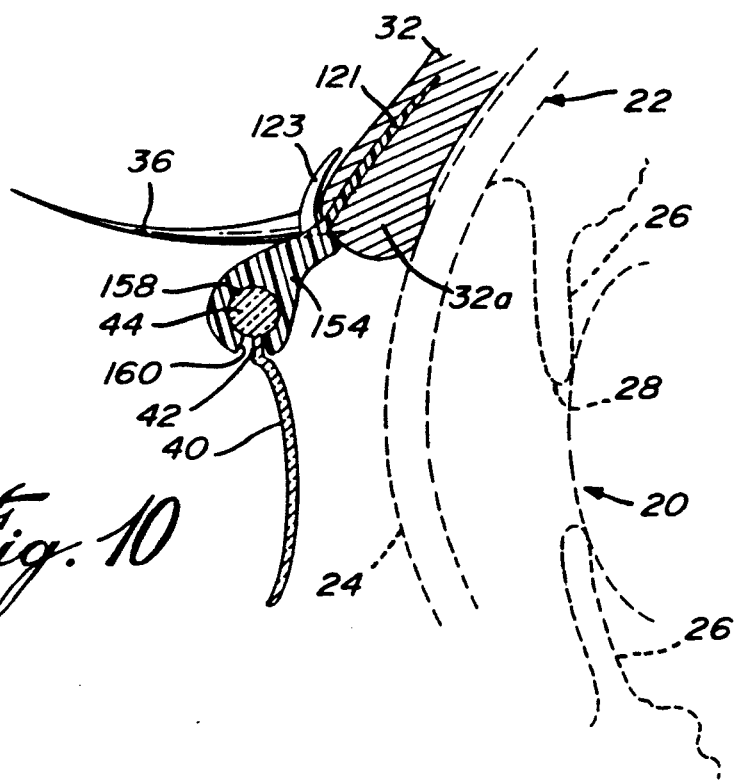
FIG. 10 is a cross-section about line 10—10 of FIG. 9.

A second embodiment of mount means 46 is illustrated in FIGS. 9-10, to replace the first mentioned ones 36. Second mount means 146 comprises a main body 154, similar in shape and dimensions to flange 54 of the first embodiment, including a cavity 156 defining a knurled channel 158 having a lengthwise, downwardly opening mouth 160 and an endwise mouth 158a, and closed at the other end by an annular seat 162. Shaft 44 of lens 40 is slidably mounted into channel 158 with lens finger 42 extending transversely of mouth 160, so that lens 40 depends downwardly from body 154. From the side of body 154 opposite channel 158 projects an integral Y-shape leg 121. Body 154 being applied against the underface of the root portion of upper lashes 36, and against the upper lid marginal portion 32a, Y-extension 121 is subcutaneously engaged into the upper eyelid 32, and thereafter surgically implanted thereto by temporary stitches (not shown). It is understood that the diverging legs of Y-extension 121 prevents torsional forces that could be applied onto lens 40, from damaging eyelid tissues about the main leg of the Y-extension 121.

Preferably, at least one pair of additional integral fingers 123, 125 are provided, projecting from body 154 on opposite sides of Y-extension 121. Fingers 123, 125, which are preferably shorter than Y-implant 121, extend over and abut against the outer face of upper lid 32, in between a pair of successive lashes 36. Fingers 123, 125 provides added stability to the synthetic lens 40 when installed with the implant 121.

It is understood that with first mount means 46, lens 40 may be removed daily, either by releasing arms 48 and 50 from lashes 36, or less desirably by pulling lens 40 outwardly of channel 58 while leaving arms 48 and 50 inclusive of flange 54 attached to lashes 36. Second mount means 146 are designed to remain anchored to the upper eyelid 32 for much longer periods of times, e.g. a few months. It is noted that even with the second mount means, 146, the lens 40 could be released daily therefrom, e.g. during sleep, by pulling the synthetic lens 40 outwardly of channel 158.

It is noted that there is a standing back of about 4 mm between the free edge of the upper eyelid and the free edge of the inferior eyelid. Indeed, it is thanks to this horizontal offsetting between the marginal edge of the lids—the upper lid being ahead in front of the level of the lower lid—that the upper lid dependent lens 40 positively clears the eyeball. This remains true as the wearer's head is inclined downwardly, as well as when the lids are closed: FIGS. 2-4 of the drawings.

Preferably, channels 58, 158 are coated with silastic, for improving rotating smoothness of the studs 44, 144 therein.

It is understood that with either of the present lens mouth assemblies, adjustments of the lens 40 is possible horizontally, temporally as well as nasally, for adjusting the centrage of the lens in relation to the visual axis. This adjustment may be done either subjectively, by the patient himself, or objectively with the pupillar reflection.

Preferably, elements 50, 54 and 154 have a shape molded in a malleable or pliable material, such as heated transparent sheet plastic, to conform to the upper eyelid as explained hereinabove. They may have a width of about 3 mm in the central part and about 1 m in the two extremities. The thickness of the upper jaw 50 may be of 1 mm, as for the lower jaw 54 except for its intermediate section which would have a thickness of about 1.5 mm. The upper jaw could be provided with false eyelashes. The length of each eyelash jaw 50, 54 could be in the order of 20 to 25 mm, depending on the size of the wearer's eyelid. The lens 40 could be tinted, but only in front of the iris. Arms 48, 50, and implant main body 154 are made from very light, supple, non irritating material, preferably flesh-colored to be as inconspicuous as possible; preferably, this material will be a lightweight plastic material, as least semi-rigid. Spring-loaded hinge 52 could preferably be metallic.

The present correcting lens assembly is much less expensive than conventional spectacles and glasses, the more so with contact lenses.

The present correcting lens assembly could alternately be used in combination with spectacles, to have a non-cumbersome Galilean optical system, as an aid for low-vision affected persons.

Relative contra-indications for the use of the present lens assembly include: psychological reasons (e.g., mentally handicaped persons), pathological affections: blepharitis, stye, chalazion, ptosis or excessive exophthalmia, and others. Patients will be advised to remove the lens, or the lens mount assembly including the lens, at night time or when the person wants to sleep.

Fog or freezing can eventually blur the present lens 40. If this situation occurs, the patient can pivot the lens frontwardly about axle 44 or 144, to clean it. In any event, it is understood that a natural defogging means will exist, since the lens will benefit from natural heating irradiation from the eyeball because the latter is positioned very close, albeit spacedly from, the lens.

I claim:

1. An optical correcting lens assembly for use by a visually impaired person, comprising:
   (a) lens means, for use spacely ahead of the eyeball of said person;
   (b) anchor means, for releasably engaging the eyelashes of said person's upper eyelid;
   (c) connecting means, for releasably interconnecting said lens means and anchor means;
   wherein after each eyelid blinking, said lens means returns to an operative position, suspended to said upper eyelid eyelashes, at a substantially constant, closely spaced distance from the cornea of said person's eyeball.

2. An optical correcting lens for use by a viscosity impaired person, as in claim 1, wherein said lens means further defines, when said eyelids are closed, an inoperative position, in which said lens means extends ahead of the lower eyelid generally within said lower eyelid eyelashes.

3. An optical correcting lens for use by a viscosity impaired person, as in claim 1, further including position adjusting means, for providing at least two alternate, set, operative positions for said lens means different distances from said cornea.

4. An optical correcting lens for use by a viscosity impaired person, as defined in claim 3, wherein said anchor means consists of a pair of elongated, upper and lower, semi-rigid stems and hinge means hingedly interconnecting one end portion of said stems for relative movement thereof, said hinge means of the spring-loaded type having means to gently draw said stems toward one another, said stems to frictionally take in sandwich said upper eyelid eyelashes, each said stem further having a marginal portion bearing against said upper eyelid above and beneath said upper eyelid eyelashes, and said upper stem further having an additional flange portion transverse to said marginal portion thereof and flatly abutting against said upper eyelid eyelashes.

5. An optical correcting lens for use by a viscosity impaired person, as defined in claim 4, wherein said marginal portion of said lower stem defines an enlarged, thick body, including a groove, made lengthwisely thereof, said groove having a narrow lengthwise mouth; said lens means defining an optical area having an edge portion from which depends an enlarged flange; said flange and said groove being of mating dimensions; wherein said connecting means consists in the releasable frictional engagement of said lens means enlarged flange into said anchor means lower stem groove with said edge portion freely engaged through said mouth.

6. An optical correcting lens for use by a viscosity impaired person, as defined in claim 4, wherein said groove forms a cylindrical channel and said flange forms a cylindrical stud; said position adjusting means consisting in providing a first knurled surface onto said channel and second knurled surface onto said stud in mating engagement with said first knurled surface.

7. An optical correcting lens for use by a viscosity impaired person, as defined in claim 3, wherein said anchor means consists of a strip member, being implanted subcutaneously of said upper eyelid, and a main semi-rigid anchor body, integral to said strip member and engaging said upper eyelid eyelashes and defining a marginal portion bearing against said upper eyelid beneath said upper eyelid eyelashes.

8. An optical correcting lens for use by a viscosity impaired person, as in claim 7, with said anchor means further including at least a pair of semi-rigid fingers, integrally projecting from said main anchor body ahead of said upper eyelid and above said upper eyelid eyelashes, each said finger extending between a pair of successive upper eyelid eyelashes and therebeyond.

9. An optical correcting lens for use by a viscosity impaired person, as in claim 8, wherein said marginal portion of said anchor body defines an enlarged part including a groove, made lengthwisely thereof, said groove having a narrow lengthwise mouth; said lens means defining an optical area having an edge portion from which depends an enlarged flange; said flange and said groove being of mating dimensions; wherein said connecting means consists in the releasable frictional engagement of said lens means enlarged flange into said anchor means groove with said edge portion freely engaged through said mouth.

10. An optical correcting lens for use by a viscosity impaired person, as in claim 9, wherein said groove forms a cylindrical channels and said flange forms a cylindrical stud; said position adjusting means consisting in providing a first knurled surface onto said channel and second knurled surface onto said stud in mating engagement with said first knurled surface.

11. An optical correcting lens for use by a viscosity impaired person, as in claim 4, further including handling means, for facilitating manual relative displacement of said stems.

12. An optical correcting lens for use by a viscosity impaired person, as in claim 6, further including stop means, at one end of said channel, for preventing accidental release of said stud axially from said channel.

13. An optical correcting lens for use by a viscosity impaired person, as in claim 10, further including stop means, at one end of said channel, for preventing accidental release of said stud axially from said channel.

14. An optical correcting lens for use by a viscosity impaired person, as in claim 7, wherein said subcutaneously implanted strip member is Y- or T-shaped, defining a base leg, integral to said anchor body, and two diverging legs, opposite said anchor body.

15. An optical correcting lens for use by a viscosity impaired person, as in claim 12, wherein said channel defines an axial end mouth opposite said stop means, for endwise engagement by said stud, said axial mouth being funnel shape for facilitating said stud engagement.

16. An optical correcting lens for use by a viscosity impaired person, as in claim 13, wherein said channel defines an axial end mouth opposite said stop means, for endwise engagement by said stud, said axial mouth being funnel shape for facilitating said stud engagement.

* * * * *